United States Patent [19]

Langen et al.

[11] Patent Number: 4,993,110

[45] Date of Patent: Feb. 19, 1991

[54] DEVICE FOR BONING PIECES OF MEAT WITH SHAPED STAMPS

[75] Inventors: Christianus P. Langen; Johannes C. Langen, both of Cuijk, Netherlands

[73] Assignee: Langen Research B.V., Cuijk, Netherlands

[21] Appl. No.: 427,640

[22] Filed: Oct. 27, 1989

[30] Foreign Application Priority Data

Nov. 9, 1988 [NL] Netherlands .......................... 8802759
Dec. 21, 1988 [NL] Netherlands .......................... 8803131

[51] Int. Cl.$^5$ .............................................. A22C 17/04
[52] U.S. Cl. ...................................................... 452/138
[58] Field of Search ............................ 17/1 G, 11, 46

[56] References Cited

U.S. PATENT DOCUMENTS

| | | | |
|---|---|---|---|
| 2,857,619 | 10/1958 | Massengill | 17/1 G |
| 4,594,751 | 6/1986 | Ketels | 17/46 |
| 4,649,600 | 3/1987 | Langen et al. | 17/11 |
| 4,663,804 | 5/1987 | Langen et al. | 17/11 |
| 4,862,558 | 9/1989 | Langen et al. | 17/1 G |

Primary Examiner—Willis Little
Attorney, Agent, or Firm—Fetherstonhaugh & Co.

[57] ABSTRACT

A device for boning pieces of meat, such as shoulders, hams and the like, which device consists substantially of at least one set of first and second matrices (3, 4) with separating means to be carried towards one another for separating the meat from the piece of bone and a replaceable stamp (5, 6) arranged in one of each matrix, of which the elongate, if necessary folding pressure surface coming into contact with the piece of bone displays a relief, wherein in cross section the relief of the pressure surface is raised at least along the edge zones thereof, and the raising increases in those cross sections at the edge portions having a comparatively small radius of curvature, so ensuring that during pressing the piece of bone remains enclosed an even undergoes a pressure force directed lengthwise of the piece of bone.

2 Claims, 17 Drawing Sheets

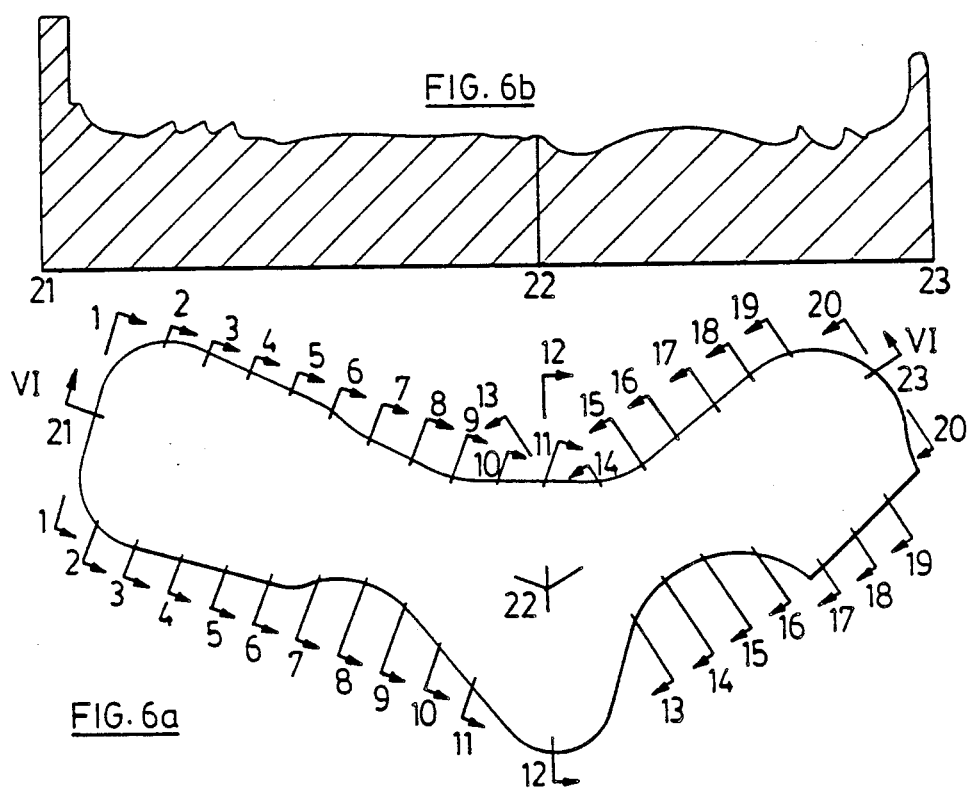
FIG. 6b
FIG. 6a
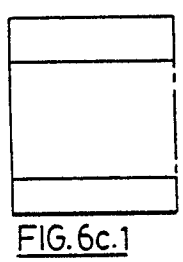
FIG.6c.1
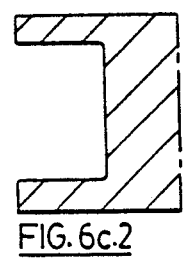
FIG.6c.2
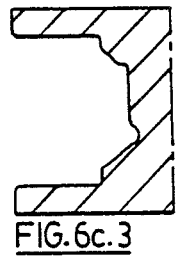
FIG.6c.3
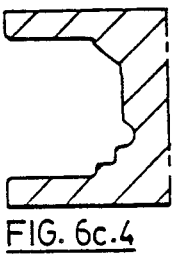
FIG.6c.4
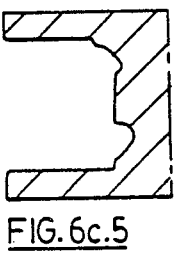
FIG.6c.5
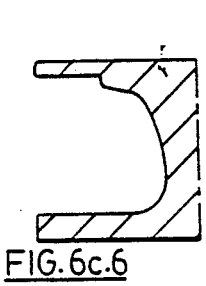
FIG.6c.6
FIG.6c.7
FIG.6c.8
FIG.6c.9
FIG.6c.10
FIG.6c.11
FIG.6c.12
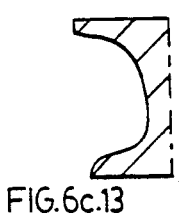
FIG.6c.13
FIG.6c.14
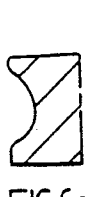
FIG.6c.15
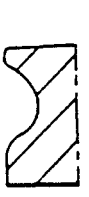
FIG.6c.16
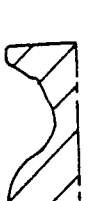
FIG.6c.19
FIG.6c.19
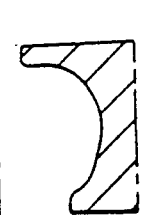
FIG.6c.18
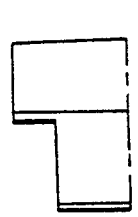
FIG.6c.19
FIG.6c.20

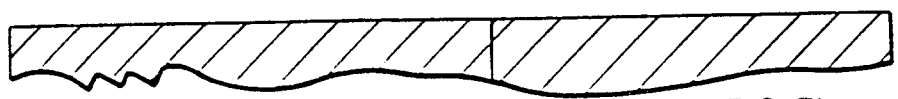
FIG.7b
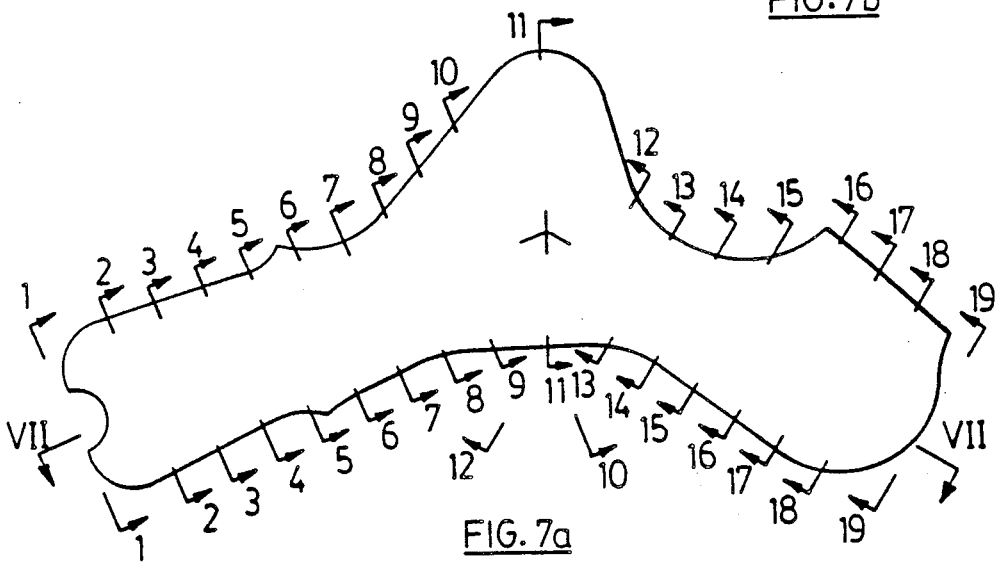
FIG.7a
FIG.7c.1
FIG.7c.2
FIG.7c.3
FIG.7c.4
FIG.7c.5
FIG.7c.6
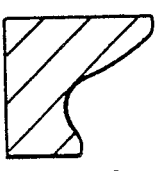
FIG.7c.7
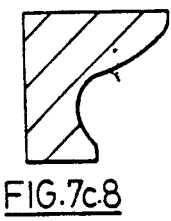
FIG.7c.8
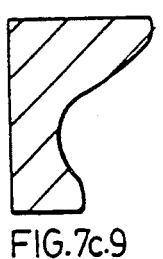
FIG.7c.9
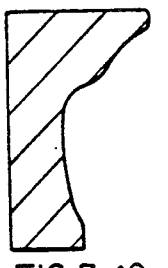
FIG.7c.10
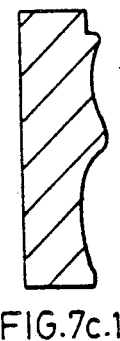
FIG.7c.11
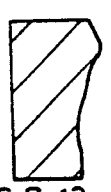
FIG.7c.12
FIG.7c.13
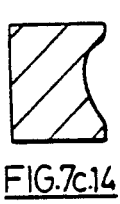
FIG.7c.14
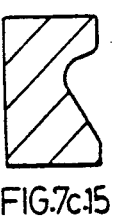
FIG.7c.15
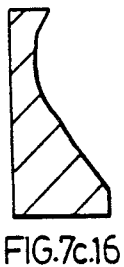
FIG.7c.16
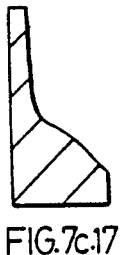
FIG.7c.17
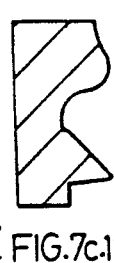
FIG.7c.18
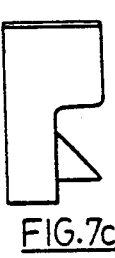
FIG.7c.19

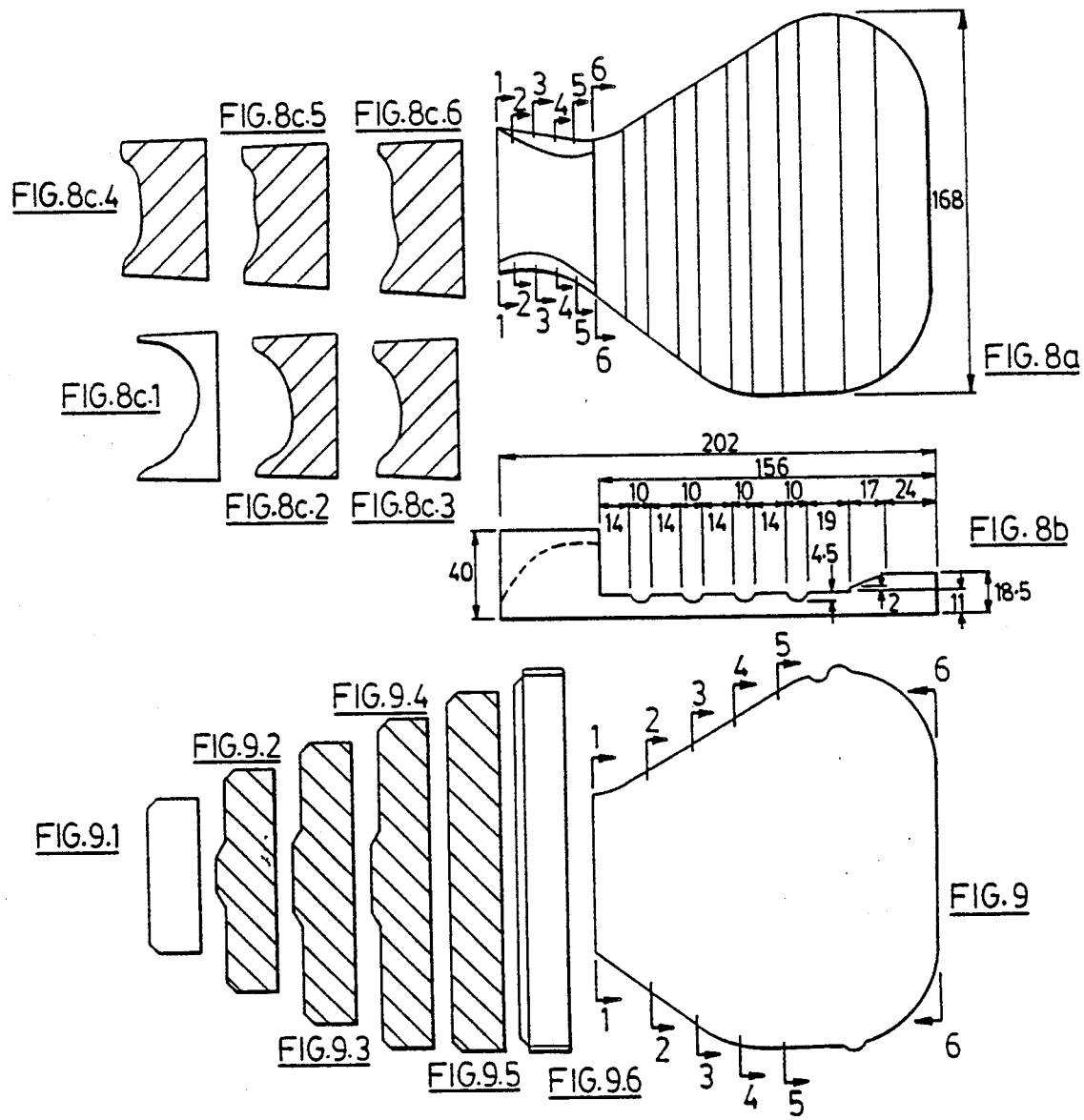

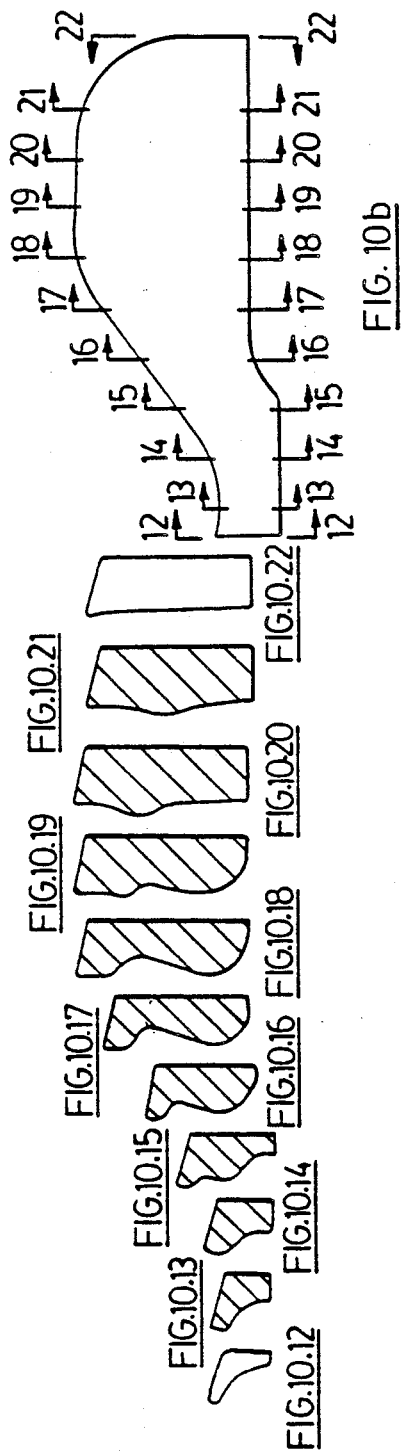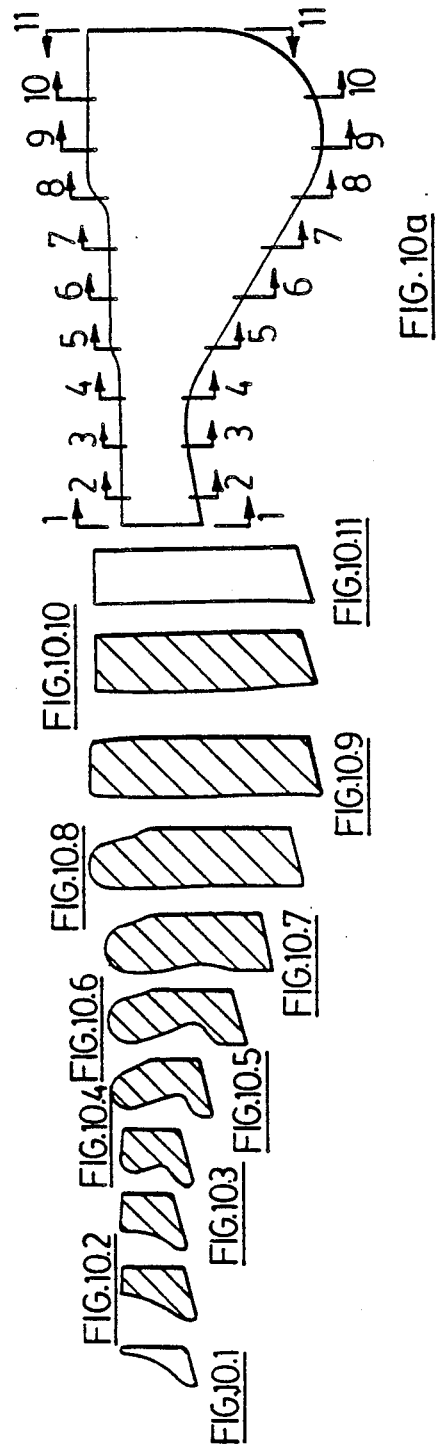

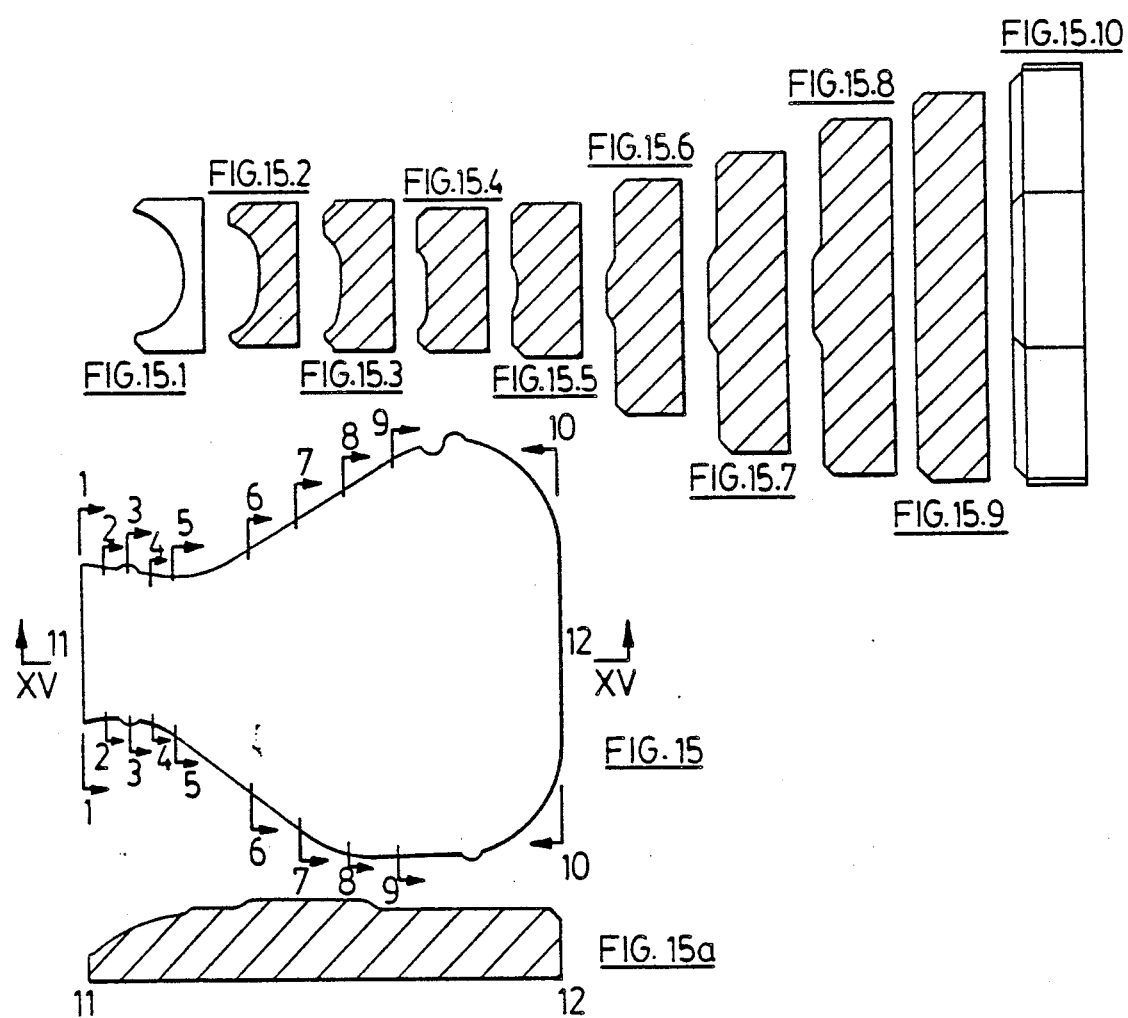

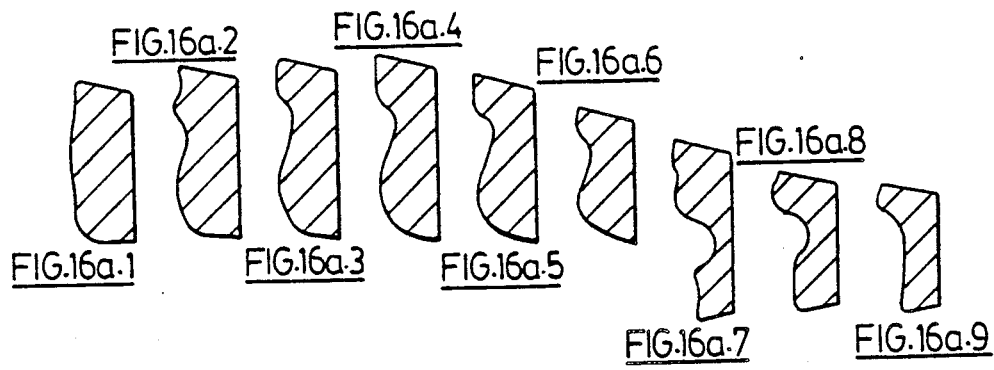
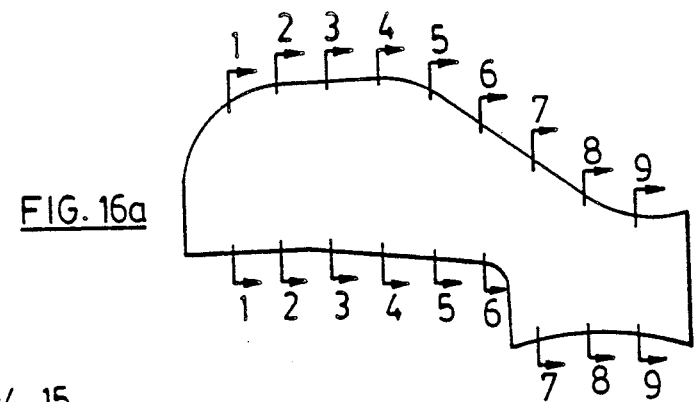
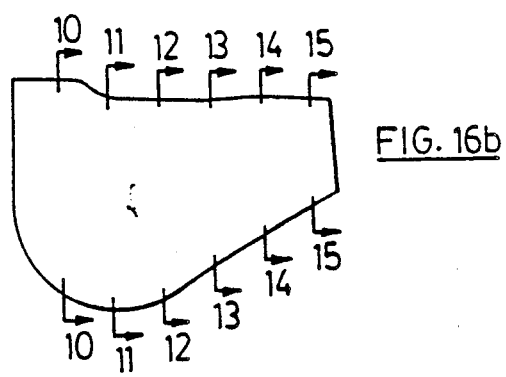
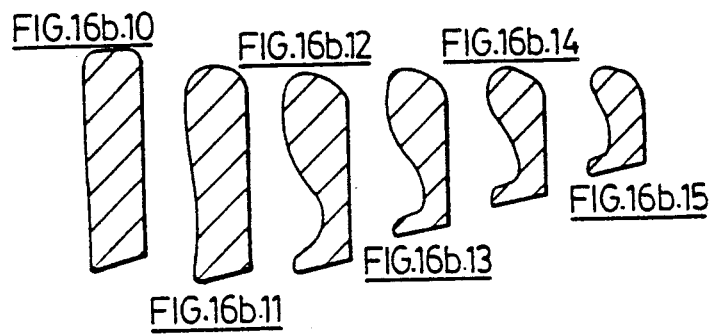

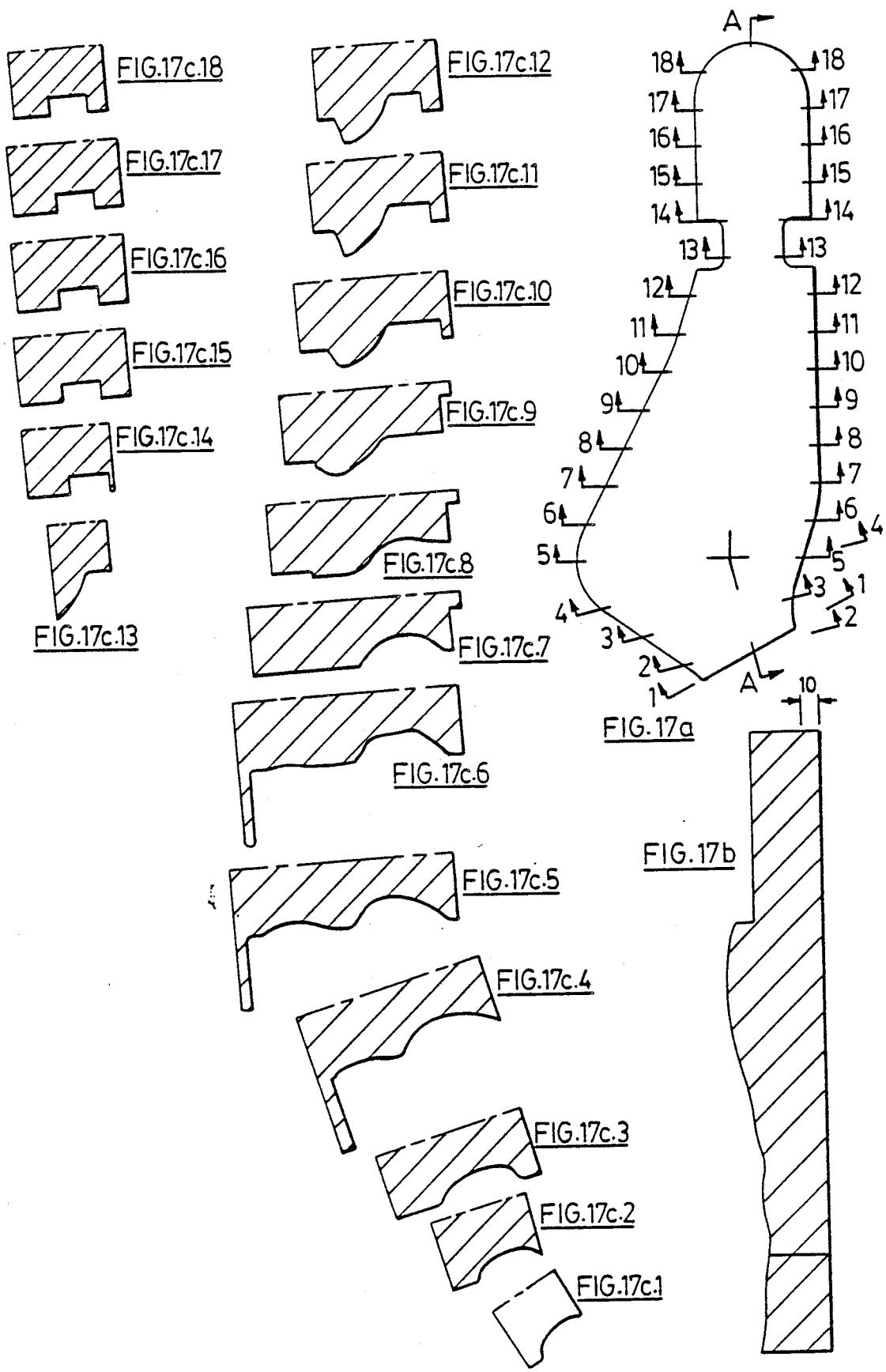

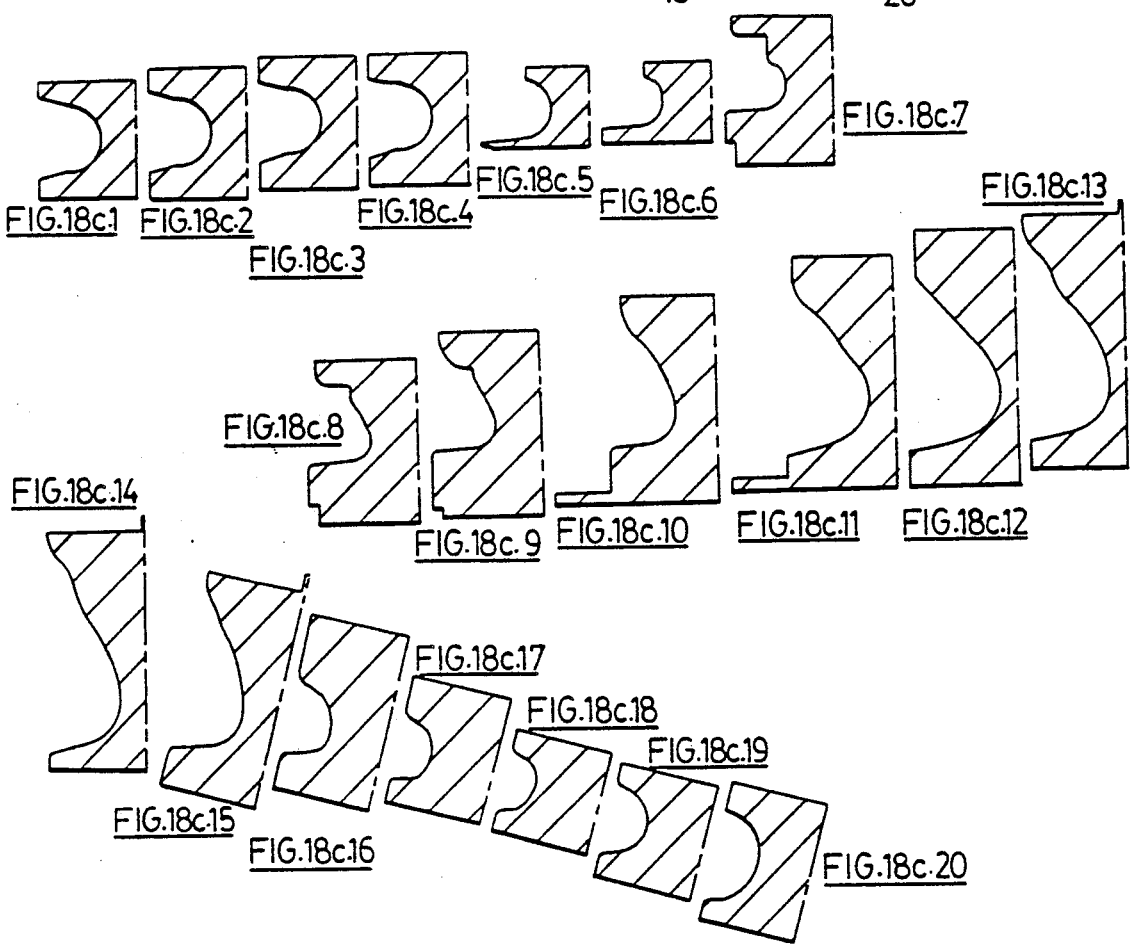

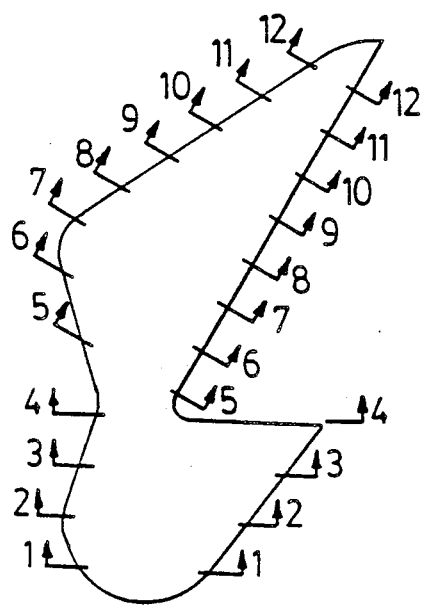
FIG.19a
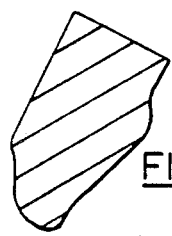
FIG.19b.5
FIG.19b.4
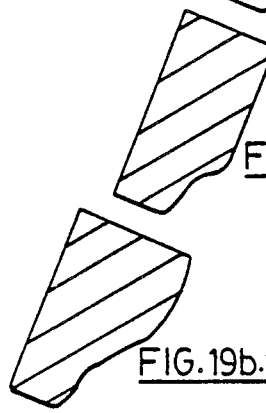
FIG.19b.12
FIG.19b.11
FIG.19b.10
FIG.19b.9
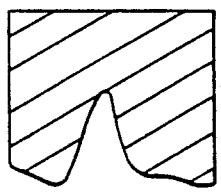
FIG.19b.3
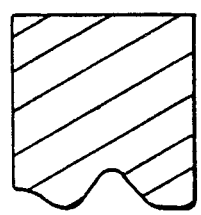
FIG.19b.2
FIG.19b.1
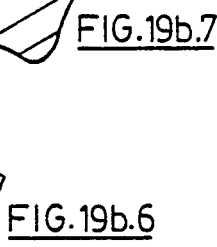
FIG.19b.8
FIG.19b.7
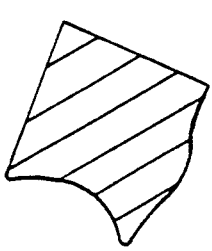
FIG.19b.6

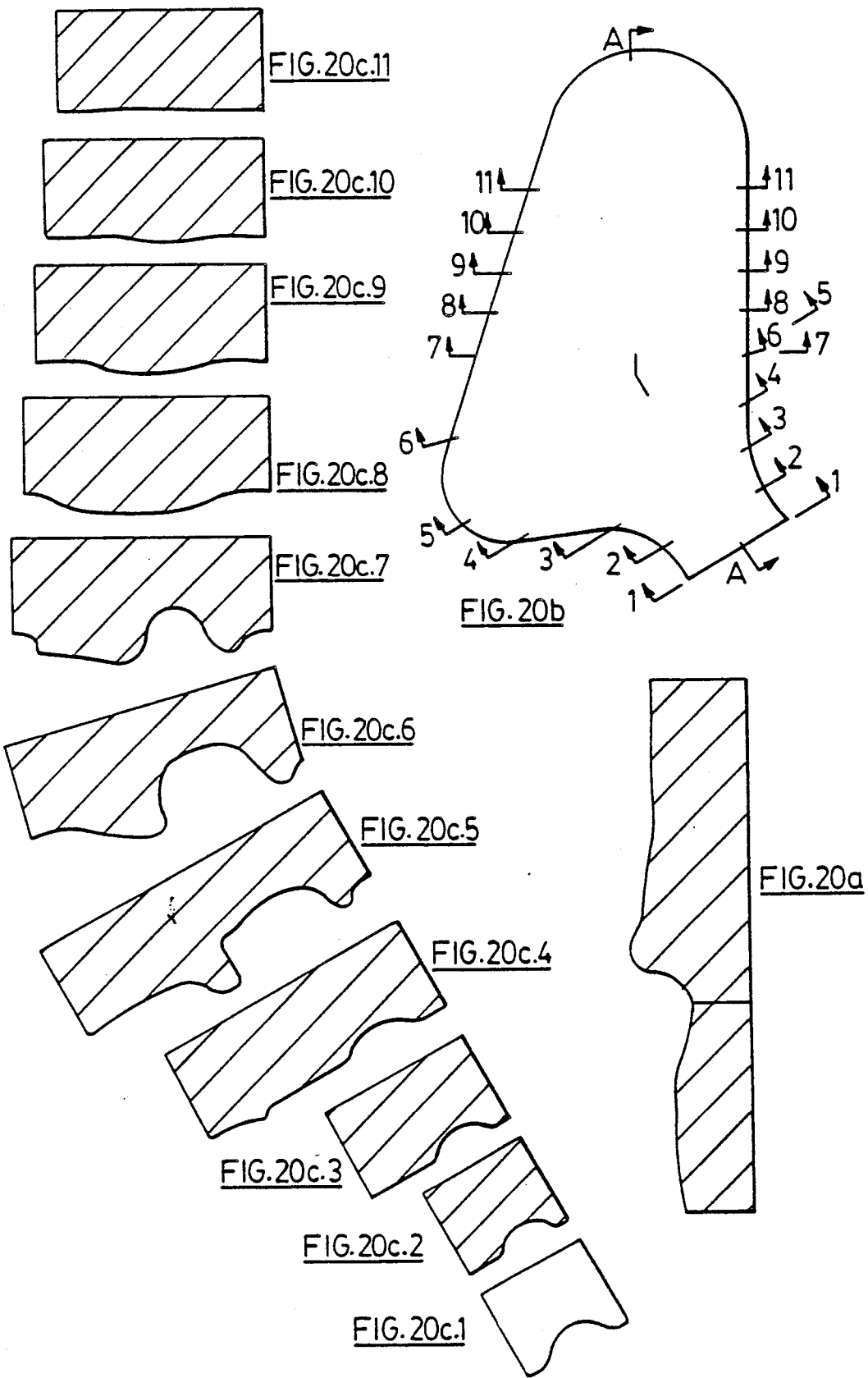

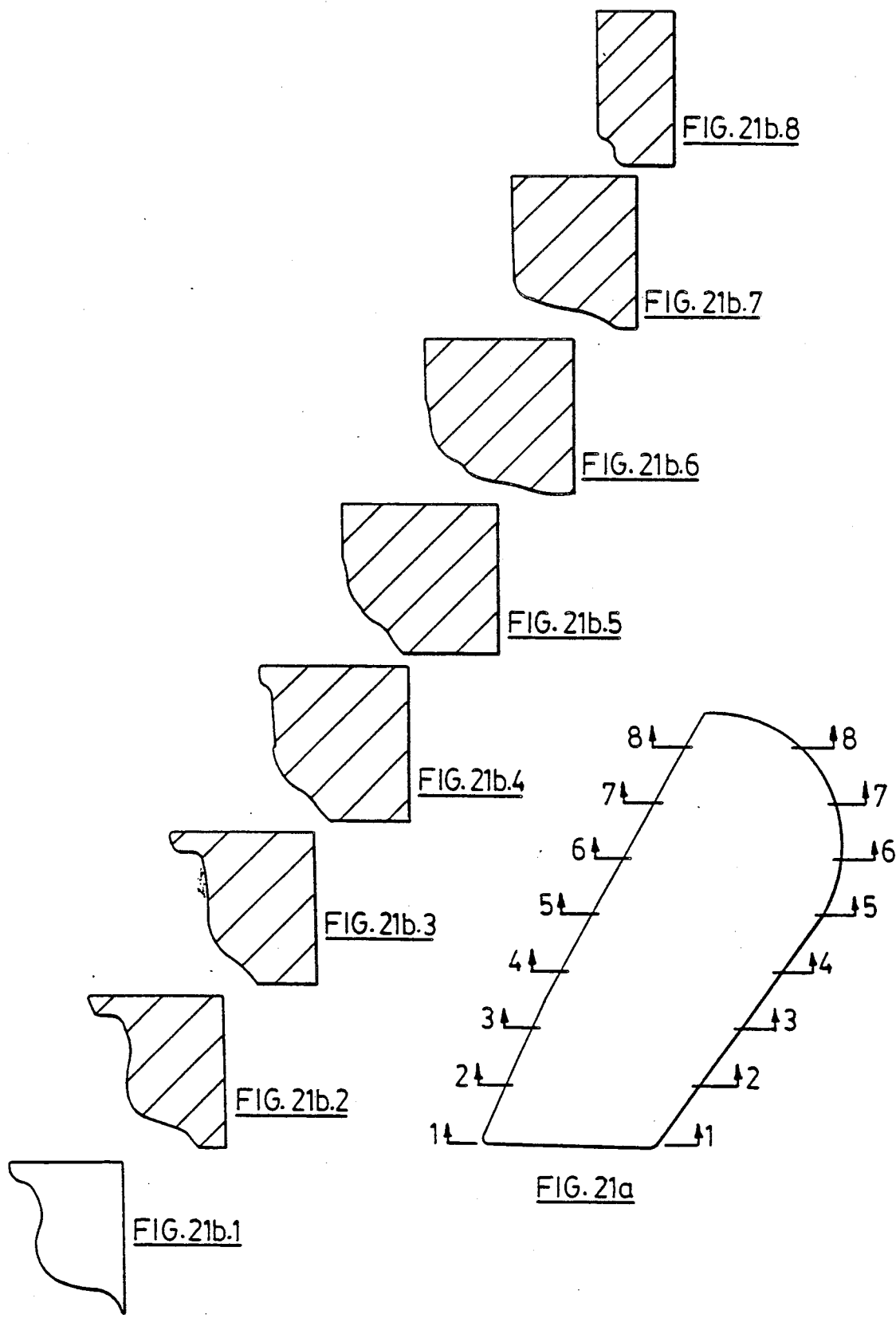

DEVICE FOR BONING PIECES OF MEAT WITH SHAPED STAMPS

The invention relates to a device for boning pieces of meat, such as shoulders, hams and the like, which device consists substantially of at least one set of first and second matrices with separating means to be carried towards one another for separating the meat from the piece of bone and a replaceable stamp arranged in one or each matrix, of which the elongate, if necessary folding pressure surface coming into contact with the piece of bone displays a relief.

Such a device is known for instance from the European publication No. 0 086 020. In this publication the means accommodated in the matrix for supporting the piece of bone are shown as layers of yielding material such as rubber. These insert pieces have a more or less contoured form that is adapted to the shape of the piece of bone to be removed from the piece of meat. This relief is arranged in order to prevent as far as possible any bone breakage during the pressing, which in practice has been found to be unsatisfactory.

The invention has for its object to provide a device whereby bone breakage is virtually prevented.

The invention provides to this end a device that is distinguished in that in cross section the relief of the pressure surface is raised at least along the edge zones thereof, and the raising increases in those cross sections at the edge portions having a comparatively small radius of curvature.

Thus ensured is that during pressing the piece of bone remains enclosed and even undergoes a pressure force directed lengthwise of the piece of bone.

The invention further proposes to embody the stamp wholly or partially in an undeformable material with great compression strength such as metal.

It has been found empirically that the shape of the relief does not have to correspond with the piece of bone in order to avoid the undesired breakage. For this purpose the stamp is manufactured for particular pieces of bone with a relief corresponding to the annexed figures.

The invention is further elucidated with reference to the figure description hereinafter of a number of embodiments.

BRIEF DESCRIPTION OF THE DRAWINGS

FIG. 6a is a plan view of the shoulder stamp of FIG. 2, FIG. 6b is a sectional view taken along the line VI—VI of FIG. 6a, FIGS. 6c.1 to 6c.20 are views taken along the lines 1—1 to 20—20 that appear on FIG. 6a, FIG. 7a is a plan view of the shoulder stamp of FIG. 4, FIG. 7b is a sectional side view taken along the line VII—VII of FIG. 7a, FIGS. 7c.1 to 7c19 are views taken along the lines 1—1 to 19—19 of FIG. 7a, FIG. 8 is a diagram that illustrates the contour of the perimeter of the stamp VIII of FIG. 5, FIG. 8b is a side view of the stamp illustrated in FIG. 8a, FIGS. 8c.1 to 8c.6 are views taken along the lines 1—1 to 6—6 of FIG. 8a, FIG. 9 is a plan view of the filler portion IX of FIG. 5, FIGS. 9.1 to 9.6 are views taken along the lines 1—1 to 1—6 of FIG. 9, FIG. 10a is a top view of one of the portions of the stamp X of FIG. 3, FIGS. 10.1 to 10.11 are views taken along the lines 1—1 to 11—11 of FIG. 10a, FIG. 10b is a top view of the other portion of the stamp X of FIG. 3, FIGS. 10.12 to 10.22 are views taken along the lines 12—12 to 22—22 of FIG. 10b, FIG. 15 is a plan view of the stamp identified by the arrow XV shown in FIG. 14, FIGS. 15.1 to 15.10 are views taken along the lines 1—1 to 10—10 of FIG. 15, FIG. 15a is a sectional view taken along the line XV—XV of FIG. 15, FIG. 16a is a plan view of one of the stamp portions of the stamp illustrated in FIG. 14 constructed in accordance with yet another embodiment of the present invention, FIGS. 16a.1 to 16a.9 are sectional views taken along the lines 1—1 to 9—9 of FIG. 16a, FIG 16b is a plan view of the other of the stamp portion of the stamp of FIG. 14, FIGS. 16b-10 to 16b-15 are sectional views taken along the lines 10—10 to 15—15 of FIG. 16b, FIG. 17a is a plan view of a stamp for use in the matrix illustrated in FIG. 4 which is suitable for boning hams, FIG. 17b is a sectional side view taken along the line A—A of FIG. 17a, FIGS. 17c.1 to 17c.18 are views taken along the lines 1—1 to 18—18 of FIG. 17a, FIG. 18a is a plan view of a stamp for use in the matrix illustrated in FIG. 2 which is suitable for boning hams, FIG. 18b is a sectional side view taken along the line A—A of FIG. 18a, FIG. 18c.1 to 18c.20 are cross-sectional views taken along the lines 1—1 to 20—20 of FIG. 18a, FIG. 19a is a plan view of a portion of a stamp that is suitable for boning pieces of ham, FIG. 19b.1 to 19b.12 are cross-sectional views taken along the lines 1—1 to 12—12 of FIG. 19a, FIG. 20a is a sectional side view taken along the line A—A of FIG. 20b, FIG. 20b is a plan view of a portion of a stamp that is suitable for boning pieces of ham, FIG. 20c.1 to 20c.11 are views taken along the lines 1—1 to 11—11 of FIG. 20b, FIG. 21a is a plan view of a further stamp portion suitable for boning pieces of ham, FIG. 21b.1 to 21b.8 are views taken along the lines 1—1 to 8—8 of FIG. 21a. The set of matrices as according to FIG. 1 is movable towards and away from one another by unshown means, whereby the co-action is such that the matrix edges 1 and 2 of the first matrix 3 and the second matrix 4 respectively join together precisely. These edges 1 and 2 form the separation means for severing the piece of meat shown with broken line V from the piece of bone B. It is possible with the matrix configuration shown to as it were punch the piece of bone out of the piece of meat. The piece of bone B thereby falls as precisely as possible within the matrix edges 1 and 2. Serving to sever the meat round the piece of bone is a stamp in the first and second matrix 3, 4, which stamp is shown in detail in the following figures in a number of embodiments.

Figure 1:
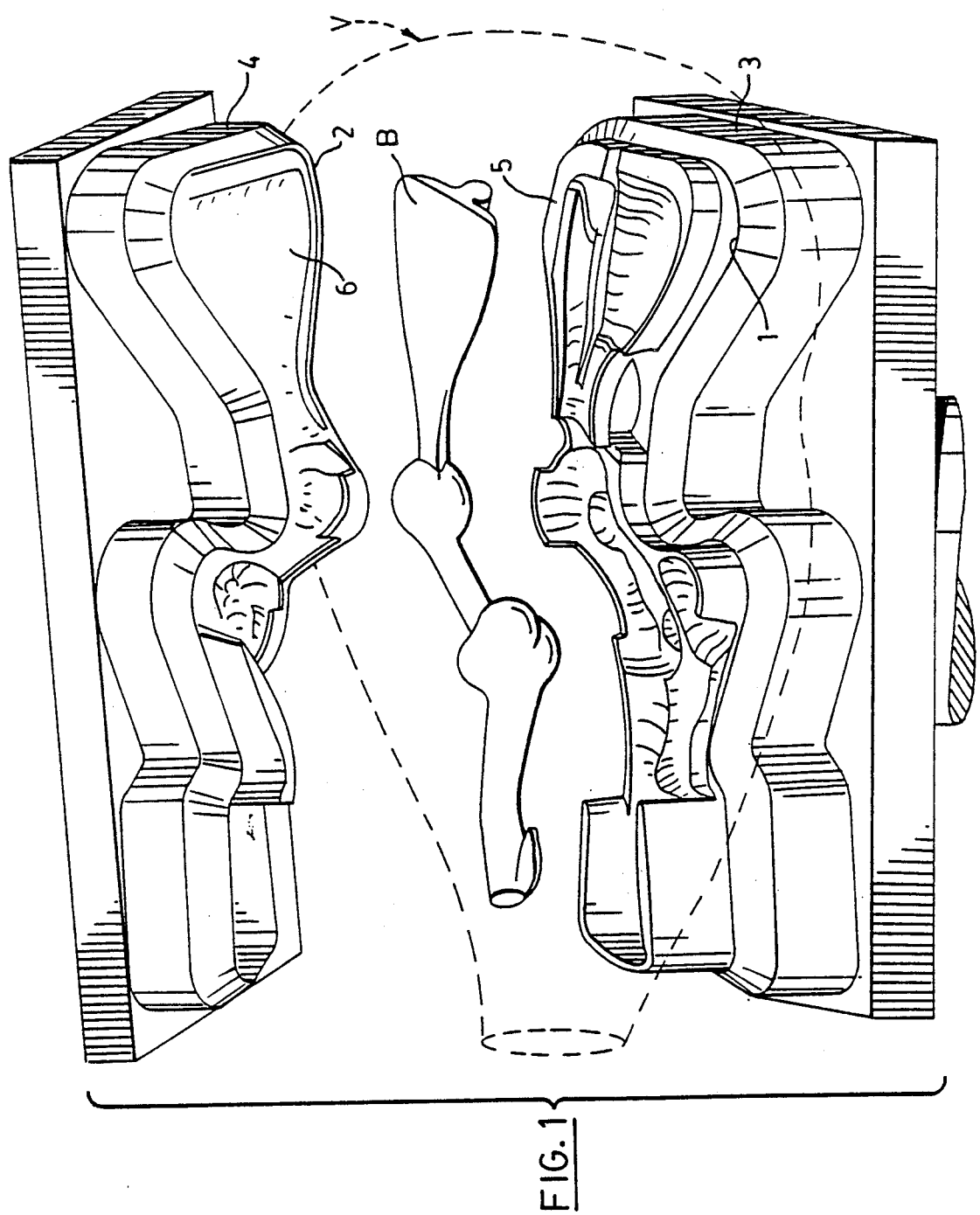
FIG. 1 is an exploded view which illustrates a set of matrices in an open position showing a bone located therebetween.

It is noted that the stamp 5 can move up and downward relative to the first matrix 3, while the stamp 6 of the second matrix 4 is arranged fixedly therein. Both stamps 5, 6 however are placed in the matrices 3, 4 so as to be replaceable.

Figure 2:
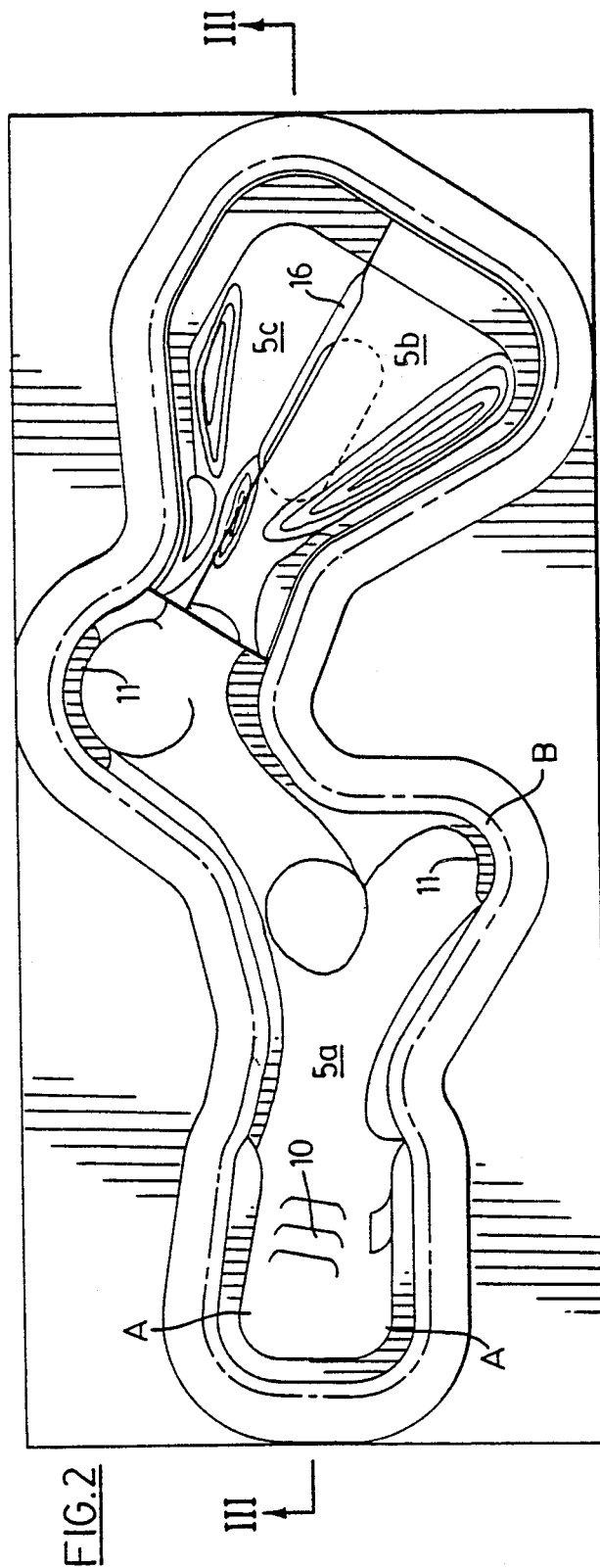
FIG. 2 is a plan view of the lower matrix of FIG. 1.
Figure 3:
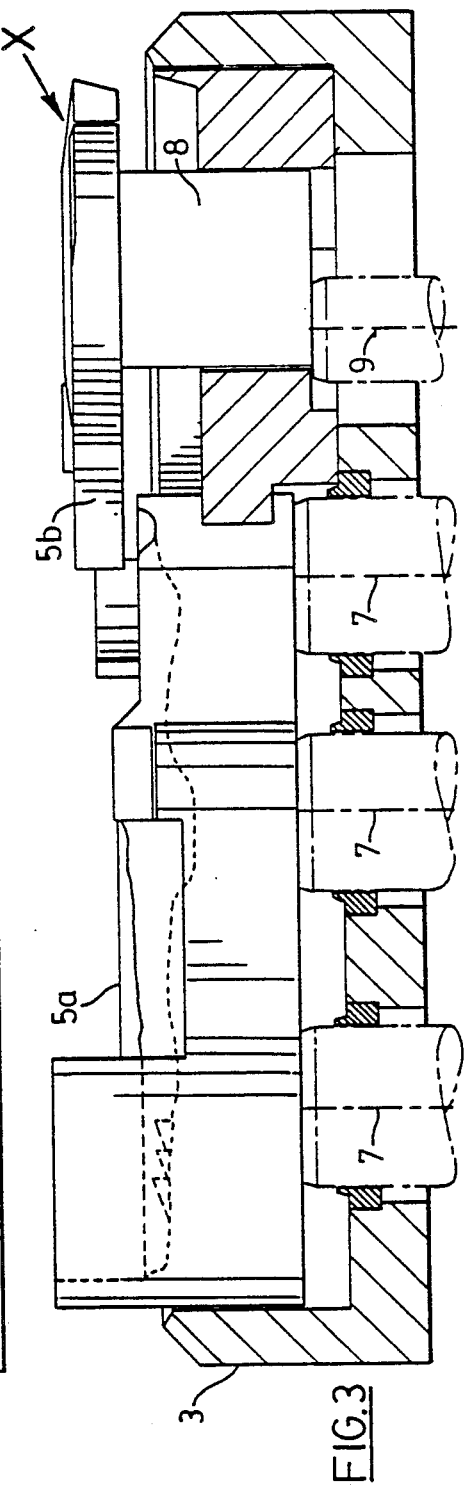
FIG. 3 is a sectional side view taken along the line III—III of FIG. 2.

FIG. 2 and 3 show a detail of the first matrix 3 having arranged therein the stamp 5 which consists here of three parts 5a, b and c.

The part 5a is supported on three rams 7 bearing mounted in the matrix 3, while the matrix portion 5b is embodied with a plunger 8 extending towards the bottom which supports on a fourth ram 9. The plunger 8 of the stamp parts 5b, 5c is directed such that when the ram 9 is moved upward relative to the matrix 3 the stamp parts 5b and 5c move away from one another.

Figure 4:
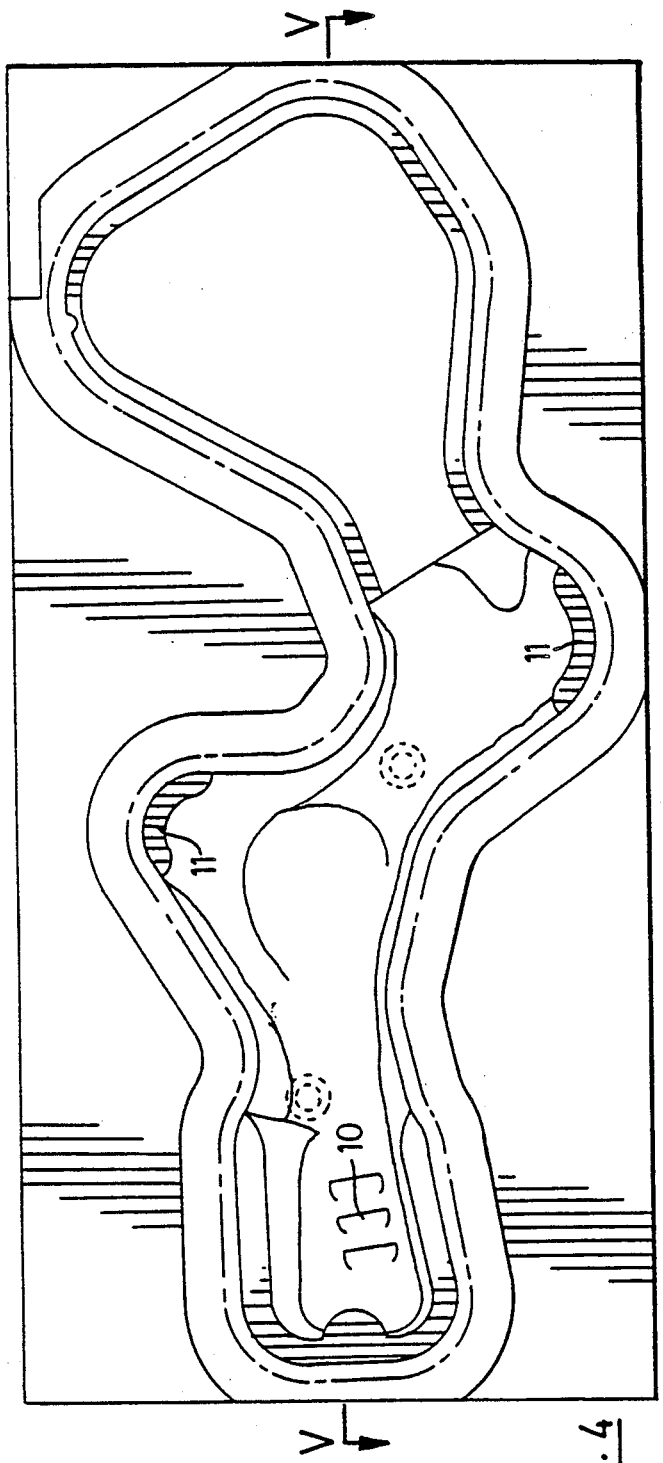
FIG. 4 is a plan view of the upper matrix of FIG. 1.
Figure 5:
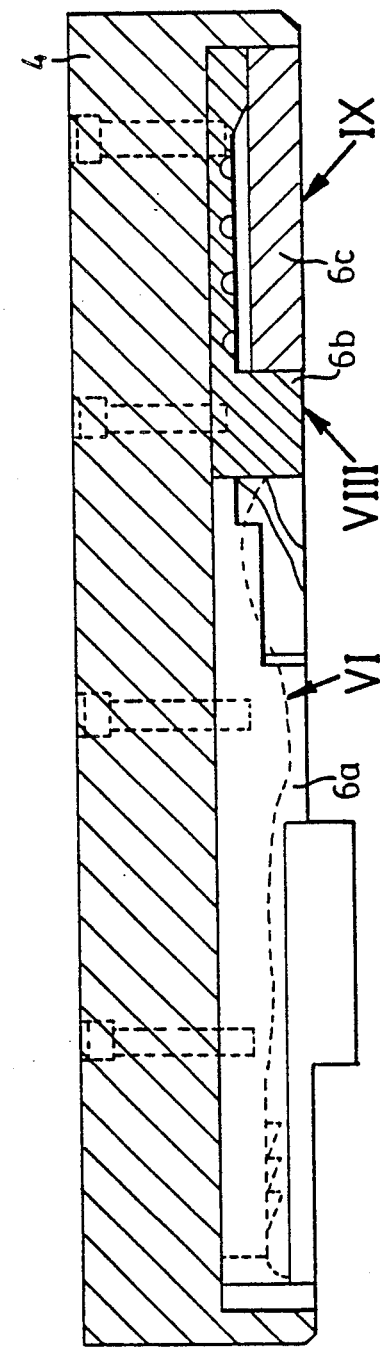
FIG. 5 is a sectional side view taken along the line V—V of FIG. 4.
Figure 8:
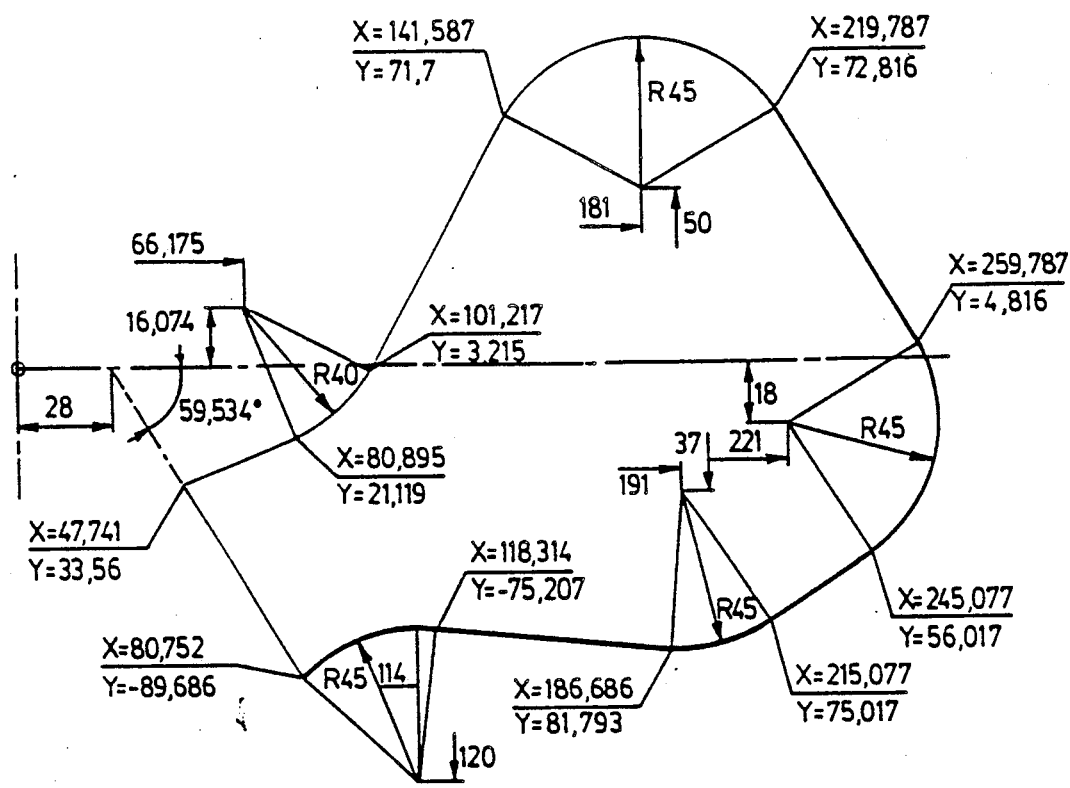
FIG. 8a is a plan view of the shoulder portion of the stamp of FIG. 4.
FIG. 8b is a side view of the stamp of FIG. 8a, FIG. 8c.1 to FIG. 8c.6 are views taken along the lines of 1—1 to 6—6 of FIG. 8a, FIG. 8a is a plan view of the stamp VIII of FIG. 5.

FIG. 4 and 5 show in detail the stamp of the second matrix 4 which here also consists of three parts, namely stamp parts 6a, 6b and 6c. The stamp part 6a co-acts with the stamp part 5a from FIG. 3, while the stamp parts 6b and c coact with the stamp parts 5b and c from FIG. 2.

It is remarked that the stamp parts 5a and 6a are cast, machined or otherwise manufactured from metal, while 6b and 6c can be made of plastic. The invention is however not limited in the choice of material, with the proviso that the material does have to be form-retaining and must display a high compression strength. The matrix shown in FIG. 1-4 serves for shoulder pieces whereby the shoulder blade of the foreleg of for instance a pig comes to lie between the stamp parts 5b and c and 6b and c, while the two other leg pieces of the bone come to lie between the stamp parts 5a and 6a.

The pressure surface of the stamps, that is, the mutually facing surfaces of the stamps in the first and second matrix 3, 4 has a predetermined relief for a particular type of piece of bone.

Worthy of note here is that the relief does not exactly match the peripheral form of the bone to be removed from the piece of meat V. The relief is chosen such that the piece of bone is loaded in optimal manner during pressing such that it does not break. The relevant form for this purpose is shown in the FIGS. 6-10 whereby a particular configuration of the pressure surface is shown both in lengthwise direction of the elongate pressure surface and in many cross sections.

It is hereby noted that at least the edge strips of the pressure surface of the stamp displays an elevation which increases in height towards at least one end, that is, the left-hand end in FIG. 2 and 4, and particularly increases in height at that location where the edge strip has a large radius of curvature, for instance in FIG. 2 at the locations A, B, C. It is further noted that close to these raised edge strips means are arranged in the bottom of the relief for placing the piece of bone under pressure, such as three ribs 10 in FIG. 2 and 4, and sloping surfaces 11 in the above mentioned figures.

Figure 11:
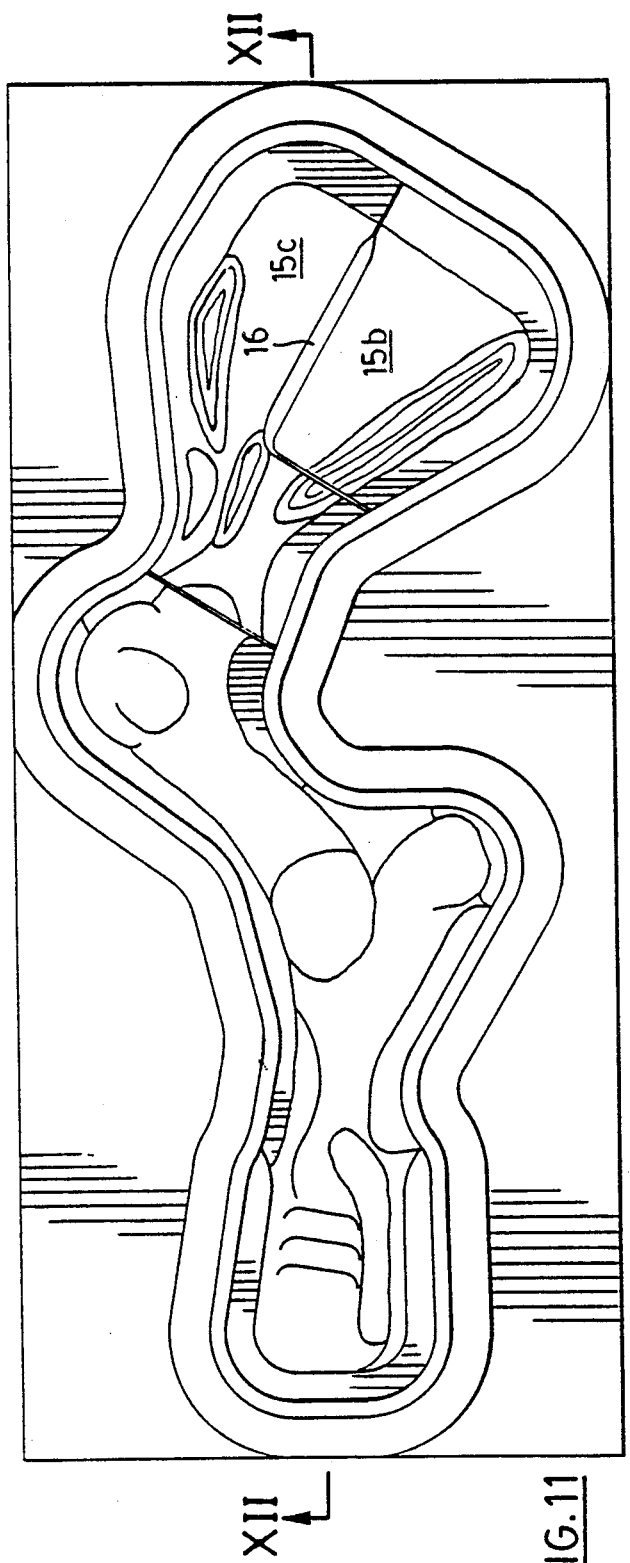
FIG. 11 is a plan view similar to FIG. 2 showing a matrix constructed in accordance with a further embodiment.
Figure 12:
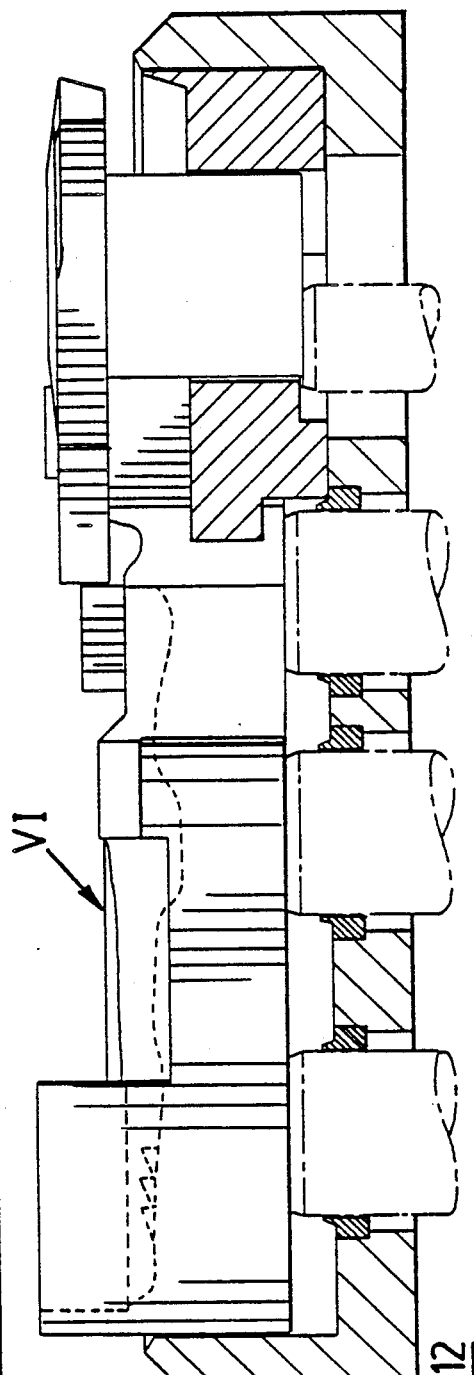
FIG. 12 is a sectional side view taken along the line XII—XII of FIG. 11.
Figure 13:
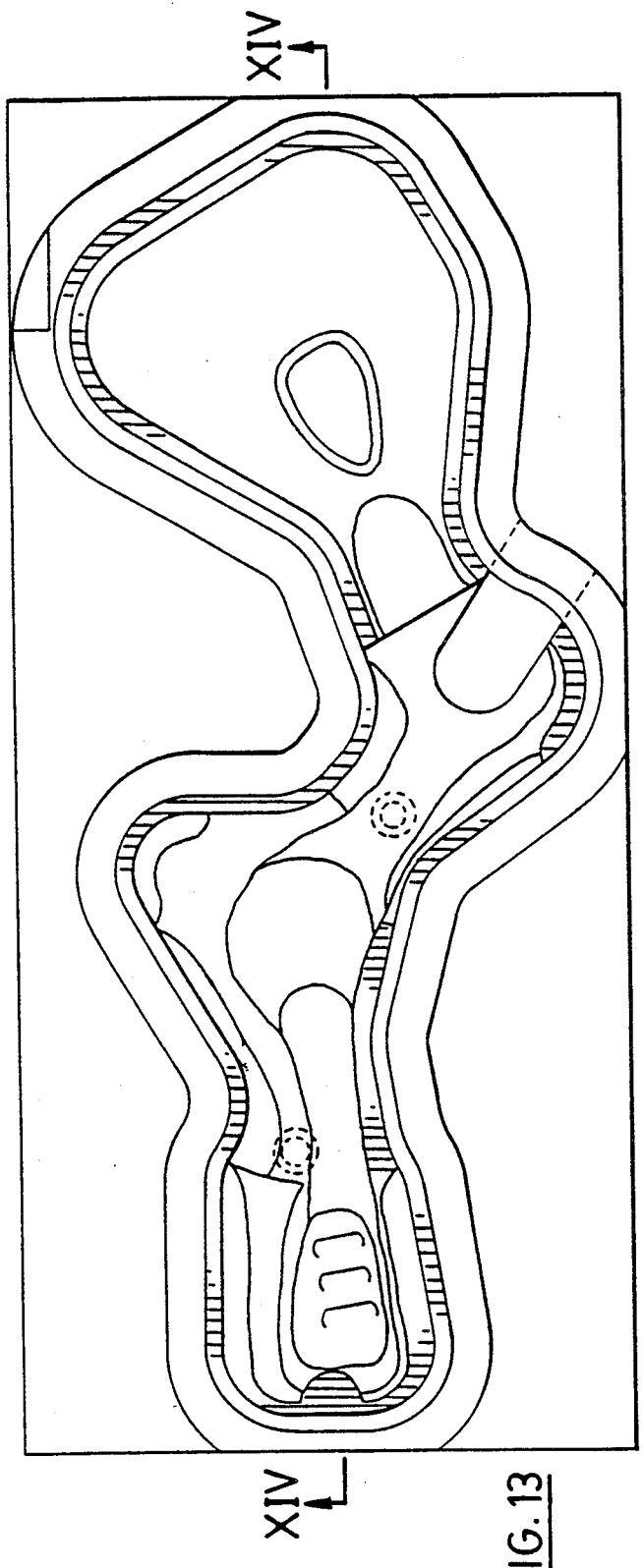
FIG. 13 is a plan view similar to FIG. 4 illustrating a further embodiment of the present invention.
Figure 14:
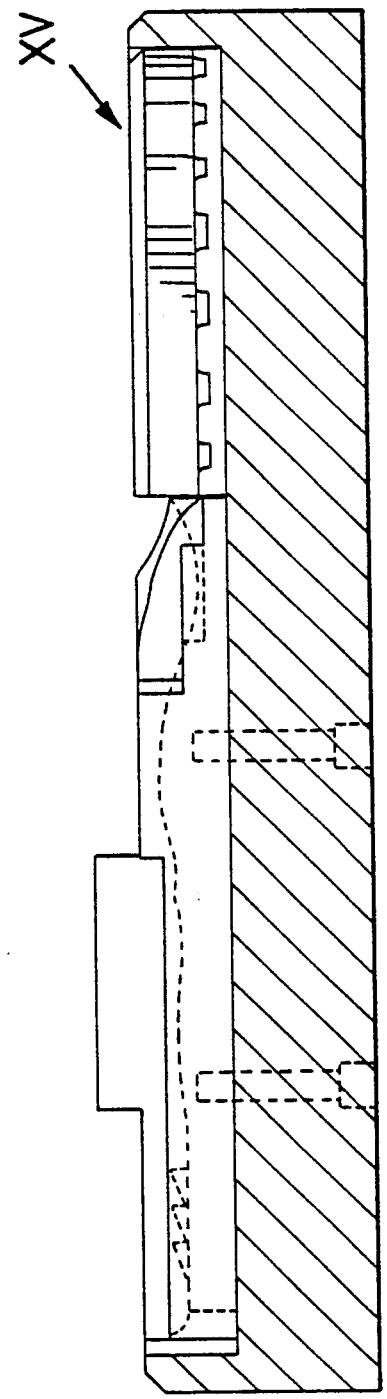
FIG. 14 is a sectional view taken along the line XIV—XIV of FIG. 13.

FIG. 11-14 once again show a set of matrices with stamps arranged therein which deviate from those of the preceding figures, particularly in the dividing up of the matrix parts 5b, 5c. In FIG. 11 the corresponding matrix parts 15b and 15c are separated from one another by a bending severing surface 16, while in the embodiment of FIG. 2 this is a straight surface. The associated counter-stamp from FIG. 14 is shown in FIG. 15.

FIG. 16 shows a stamp part forming an alternative to the stamp part as in FIG. 10 which is placeable in the first or lower matrix from FIG. 3.

Shown in FIG. 17-21 are the replaceable stamp parts for matrices according to the device from FIG. 1 which are particularly suitable for boning pieces of ham instead of the shoulder pieces as described with reference to the FIGS. 1-16.

The invention is not limited to the above described embodiment.

We claim:

1. In a set of mould which close around a bone to remove the bone from a body of meat, the moulds having complimentary mould elements each of which has a bone accommodating cavity therein which has a perimeter edge that extends around the cavity along a path that has a plurality of tight bends where the radius of curvature generated from within the cavity which is substantially less than that of the remainder of the path, the improvement wherein;

at least one of said mould elements has a raised edge portions that project a substantial distance from the cavity and extend along each of the tight bends of said path, said raised edge portions serving to penetrate the meat surrounding the bone during the initial stage of the closing of the mould to confine the bone within the perimeter edge and to compressively preload the bone both axially and radially prior to the application of the major meat removing loads thereby to substantially eliminate bone breakage during the application of the major meat removing loads resulting from the final closing of the mould.

2. A set of moulds as claimed in claim 1 wherein each cavity has a surface that is formed from a material which will not deform to any significant extent under the influence of the major loads applied to the moulds during the closing of the moulds.

* * * * *